United States Patent [19]

Feith

[11] Patent Number: 5,112,904
[45] Date of Patent: May 12, 1992

[54] LIQUID COATING COMPOSITION INCLUDING, AS A CROSSLINKING AGENT, AN UNBLOCKED MONOPRIMARY AMINE

[75] Inventor: Bernhard Feith, Stuttgart, Fed. Rep. of Germany

[73] Assignee: AKZO NV, Arnhem, Netherlands

[21] Appl. No.: 535,930

[22] Filed: Jun. 8, 1990

[30] Foreign Application Priority Data

Jun. 9, 1989 [EP] European Pat. Off. ........ 89201497.8

[51] Int. Cl.$^5$ .............................................. C08F 8/32
[52] U.S. Cl. ..................................... 525/59; 525/253; 525/259; 525/327.6; 525/328.4; 525/328.2
[58] Field of Search ................. 525/259, 328.2, 327.6, 525/328.4, 253

[56] References Cited

U.S. PATENT DOCUMENTS

| | | | |
|---|---|---|---|
| 2,759,913 | 8/1950 | Hulse | 260/89.7 |
| 3,778,418 | 12/1973 | Nakayama | 525/259 |
| 4,343,915 | 8/1982 | Abbey | 523/414 |
| 4,544,732 | 10/1985 | Corley | 528/90 |
| 4,755,623 | 7/1988 | Dileone | 564/160 |
| 4,772,680 | 9/1988 | Noomen | 528/229 |
| 4,871,806 | 10/1989 | Shalati | 525/108 |

FOREIGN PATENT DOCUMENTS

| | | |
|---|---|---|
| 0203296 | 12/1986 | European Pat. Off. . |
| 0240083 | 10/1987 | European Pat. Off. . |
| 0262720 | 4/1988 | European Pat. Off. . |
| 0264983 | 4/1988 | European Pat. Off. . |
| 0346982 | 12/1989 | European Pat. Off. . |

OTHER PUBLICATIONS

European Search Report.

*Primary Examiner*—Joseph L. Schofer
*Assistant Examiner*—Fred Zitomer
*Attorney, Agent, or Firm*—James K. Poole; Louis A. Morris

[57] ABSTRACT

A liquid coating composition is provided which comprises, as a binder, a compound containing at least two pendant activated unsaturated groups and, as a crosslinking agent for the activated unsaturated groups, a particular unblocked monoprimary amine compound. The liquid coating compositions of the present invention provide the particular advantage of surprisingly good potlife without blocking the crosslinking agent, with the resulting coating compositions displaying good properties such as, for example, solvent resistance.

12 Claims, No Drawings

LIQUID COATING COMPOSITION INCLUDING, AS A CROSSLINKING AGENT, AN UNBLOCKED MONOPRIMARY AMINE

The present application for patent is entitled to the benefit of an earlier filing date in a foreign country under 35 U.S.C. 119, based on priority application Ser. No. 89201497.8, European, June 9, 1989, which is hereby incorporated by reference.

BACKGROUND OF THE INVENTION

The present invention relates generally to a liquid coating composition which comprises, as a binder, a compound containing at least two pendant activated unsaturated groups and, as a crosslinking agent for the activated unsaturated groups of the binder, a particular unblocked monoprimary amine.

A coating composition comprising, as a binder, a compound containing at least two pendant activated unsaturated groups and an amine crosslinking agent is generally known from EP-A-0203296 (equivalent to U.S. Pat. No. 4,990,577) and EP-A-0346982 (equivalent to U.S. Pat. No. 4,981,944) which are both incorporated by reference herein for all purposes. The amine crosslinking agent may contain only one primary amino group, but it is taught that this primary amino group must be blocked with, for example, an aldehyde or ketone.

As is well-known, the reactive groups of crosslinking agents are often blocked to prevent unwanted early reaction and, consequently, decreased potlife of the coating composition. Amine crosslinking agents normally are blocked with, for example, aldehydes and/or ketones.

The use of such blocking agents can have a number of disadvantages. For example, elevated temperatures are often required to unblock the crosslinking agents and, particularly for the above blocking agents, water is required to remove the aldehyde or ketone. With very low relative humidities, therefore, the cross-linking reaction can be delayed or proceed only very slowly. Further, once the crosslinking agent is unblocked, the blocking agent must be removed or it will remain in the coating composition as an impurity. This can lead to the previously applied coating, or the coated substrate itself (particularly plastics). being attacked.

SUMMARY OF THE INVENTION

In accordance with the present invention, there is provided a liquid coating composition which comprises, as a binder, a compound containing at least two pendant activated unsaturated groups and a crosslinking agent for the activated unsaturated groups of the binder, wherein the crosslinking agent for the activated unsaturated groups of the binder comprises an unblocked monoprimary amine of the general formula (I)

$$H_2N\text{-}(CH_2)_n\text{-}NRR^1 \quad (I)$$

wherein n is a number from 1 to 4.

R is selected from an H atom a $C_1$-$C_3$ alkyl and a mono hydroxy substituted $C_1$-$C_3$ alkyl; and $R^1$ is selected from a $C_1$-$C_3$ alkyl and a monohydroxy substituted $C_1$-$C_3$ alkyl.

It has been surprisingly discovered that the use of this narrow class of monoprimary amines as crosslinking agents allows the formulation of coatings with good solvent resistance as well as good potlife. Additionally, without the aldehyde and/or ketone blocking agent, the production and use of such coating compositions are greatly simplified - not only is the entire step of blocking the crosslinking agent no longer necessary, but also the crosslinking of the system becomes independent of relative humidity.

These and other features and advantages of the present invention will be more readily understood by those skilled in the art from a reading of the following detailed description.

DETAILED DESCRIPTION OF THE PREFERRED EMBODIMENTS

As just indicated, the liquid coating compositions in accordance with the present invention comprise, as a binder, a compound containing at least two pendant activated unsaturated groups and, as a crosslinking agent for such activated unsaturated groups, a particular unblocked monoprimary amine.

As suitable at least two pendant activated unsaturated groups for the binder may be mentioned groups of the formulas (II), (III), (IV) and/or (V)

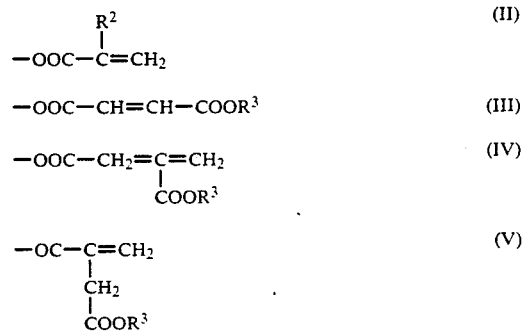

wherein $R^2$ is selected from an H atom or a methyl group.

$R^3$ is selected from an H atom, a group $R^4$, a group of the formula (VI) and a group of the formula (VII)

$$-CH(OH)-CH_2-CH_2R^5 \quad (VI)$$

$$-CH_2-CH(OH)-CH_2R^5 \quad (VII)$$

$R^3$ is selected from an alkyl group, a cycloalkyl group and an aryl group, which groups may be substituted or not with an alkyl, and $R^5$ is selected from an H atom, a group $R^4$, a group of the formula (VIII) and a group of the formula (IX)

$$-OR^4 \text{ (VIII)} \quad -OOC-R^4, \quad (IX)$$

As an example of suitable binders containing pendant activated unsaturated groups of the formula (II) may be mentioned those disclosed in previously incorporated EP-A-0203296 4,990,577 and reference may be had thereto for further details. In general, these binders may be referred to simply as acryloyl and methacryloyl groups-containing binders.

As an example of suitable binders containing pendant activated unsaturated groups of the formula (111). (IV) and/or (V) may be mentioned those disclosed in previously incorporated EP-A-0346982 4,981,944 and reference may be had thereto for further details.

As a first specific example of suitable binders containing pendant activated unsaturated groups (III), (IV) and/or (V) may be mentioned compounds resulting from the addition of maleic anhydride and/or itaconic anhydride to an OH groups-containing copolymer.

Such an OH groups-containing copolymer is preferably an addition copolymer obtained by radical polymerization of a monomer mixture of:
(1) 5-90% by weight, more preferably 10-50% by weight, of a methylol (meth)acrylamide and/or a hydroxy(cyclo)alkyl (meth)acrylate with the (cyclo)alkyl group containing 1-18 carbon atoms, and
(2) 10-95% by weight, more preferably 50-90% by weight, of another copolymerizable comonomer.

Suitable other copolymeriazble comonomers include acrylic and methacrylic esters of monoalcohols having 1-24 carbon atoms, such as metyl acrylate, methyl methacrylate, ethyl acrylate, n-propyl acrylate, n-butyl acrylate, isolbutyl acrylate, 2-ethylhexyl acrylate, n-octyl acrylate, isobornyl acrylate and oleyl acrylate; dialkyl maleates, such as dimethyl maleate and diethyl maleate; vinyl esters of alkane carboxylic acids, such as vinyl acetate and vinyl propionate; and monovinyl aromatic compounds, such as styrene, vinyl toluene, and α-methyl styrene. Of course use may also be made of mixtures of 2 or more of the aforementioned comonomers.

Other suitable OH groups-containing copolymers include copolymers of styrene and allyl alcohol, partially hydrolyzed copolymers of vinyl chloride and vinyl acetate, and partially hydrolyzed copolymers of vinyl acetate and vinyl versatate. These copolymers and their preparative processes are known to one skilled in the art and need no further elucidation here.

The addition of maleic anhydride and/or itaconic anhydride to the above-described OH groups-containing copolymers may generally be carried out at a temperature in the range of 50°-120° C. preferably in the range of 70°-120° C. During the addition there may optionally be present a catalyst such as a tertiary amine (e.g. pyridine) or an organic tin compound (e.g.. dibutyl tin oxide) in a conventional amount, for instance, 0.1% by weight calculated on the reaction components.

After the addition of the maleic anhydride and/or itaconic anhydride to the OH groups-containing copolymer, the resulting carboxylic acid groups of the addition polymer may optionally be neutralized wholly or in part with an inorganic or organic base. As examples of suitable bases may be mentioned sodium hydroxide, potassium hydroxide and tertiary amines such as triethylamine and dimethyl aminoethanol. Depending on the acid number and the degree of neutralization, the binder may become water-dilutable and usable in water-dilutable coating compositions.

Alternatively, however, the carboxylic acid groups present in the binder may optionally be reacted wholly or in part with a different appropriate compound, such as a monofunctional epoxy compound or a monoalcohol.

Suitable monofunctional epoxy compounds include ethylene oxide, propylene oxide, butylene oxide, and the higher alkylene oxides; alkyl glycidyl ethers, such as butyl glycidyl ether or hexyl glycidyl ether; and the glycidyl esters of preferably branched alkane carboxylic acids, for instance the glycidyl esters of α,α-dimethyl octanoic acid, which last-mentioned ester is commercially available under the trade designation Cardura E from Shell Chemical.

Esterification with the epoxy compound generally takes place at a temperature in the range of 80°-140° C. preferably in the range of 100°-120° C. Esterification may optionally be carried out in the presence of a catalyst such as an organic ammonium salt or an organic $Cr^{III}$ salt (e.g.. $Cr^{III}$-2-ethyl hexanoate) in conventional amounts, such as 0.01-2.0% by weight calculated on the reaction components.

Suitable monoalcohols include methanol, ethanol, propanol, isopropanol, n-butanol, isobutanol, cyclohexanol, n-decyl alcohol n-dodecyl alcohol, tricyclodecyl methanol (TCDM), oleyl alcohol and stearyl alcohol.

Esterification with the monoalcohol generally takes place at a temperature in the range of 100°-180° C. preferably in the range of 120°-160° C. Esterification may optionally be carried out in the presence of a catalyst such as p-toluene sulfonic acid or an organic tin compound (e.g.. butylchlorotindihydroxide) in conventional amounts, such as 0.01-2.0% by weight calculated on the reaction components.

As a second specific example of suitable binders containing pendant activated unsaturated groups (III), (IV) and/or (V) may be mentioned compounds obtained by reacting a monoester of maleic acid, fumaric acid and/or itaconic acid with an at least difunctional epoxy compound.

As examples of suitable difunctional or polyfunctional epoxy compounds, which as such may be solid or liquid, may be mentioned the diglycidyl or polyglycidyl ethers of (cyclo)aliphatic or aromatic hydroxyl compounds, such as ethylene glycol, glycerol, cyclohexane diol, and mononuclear or polynuclear difunctional or trifunctional phenols and bisphenols such as bisphenol-A and bisphenol-F; polyglycidyl ethers of phenol formaldehyde novolak; polymers of ethylenically unsaturated compounds containing epoxy groups, such as glycidyl (meth)acrylate, N-glycidyl (meth)acrylamide, and/or allyl glycidyl ether, and optionally of one or more different copolymerizable ethylenically unsaturated monomers; cycloaliphatic epoxy compounds, such as epoxidized and optionally subsequently hydrogenated styrene or divinyl benzene; glycidyl esters of fatty acids having for instance 6-24 carbon atoms; glycidyl (meth)acrylate; isocyanurate group-containing epoxy compounds: an epoxidized pelyalkadiene, such as epoxidized polybutadiene; hydantoin epoxy resins; epoxy resins obtained by epoxidizing aliphatic and/or cycloaliphatic alkenes, such as dipentene dioxide, dicyclopentadiene dioxide and vinyl cyclohexene dioxide; glycidyl groups-containing resins, such as polyesters or polyurethanes containing one or more glycidyl groups per molecule, and mixtures of the epoxy resins referred to above. These epoxy resins are generally known to one skilled in the art and need no further elucidation here.

Examples of suitable monoesters include fumaric, maleic and/or itaconic monoesters of alcohols such as methanol, ethanol, propanol, isopropanol, n-butanol, isobutanol, cyclohexanol, n-decyl alcohol, n-dodecyl alcohol, tricyclodecyl methanol (TCDM). oleyl alcohol and stearyl alcohol; and the monoesters of monoalkylene or polyalkylene glycols, the monoalkyl ethers and/or the monoalkane carboxylic esters thereof, such as mono(di)(propylene) ethylene glycol monomethyl(ethyl)ether. mono(di)(propylene) ethylene glycol acetate and higher analogous compounds.

The reaction of the monoester of maleic acid, fumaric acid and/or itaconic acid with the difunctional or polyfunctional epoxy compound is generally carried out at a temperature in the range of 80°–140° C. preferably in the range of 100°–120° C. During the reaction use may be made of a catalyst such as an ammonium salt or an organic chromium compound (e.g., $Cr^{III}$-2-ethyl hexanoate) in conventional amounts such as 0.01–2.0% by weight calculated on the reaction components.

As a third specific example of suitable binders containing pendant activated unsaturated groups (III), (IV) and/or (V) may be mentioned those obtained by reacting a monofunctional epoxy compound with a monoester of fumaric acid, maleic acid and/or itaconic acid, then reacting the resulting compound through the hydroxyl group with an at least difunctional isocyanate compound.

Suitable isocyanate compounds include aliphatic, cycloaliphatic or aromatic di-, tri- or tetraisocyanates which may be ethylenically unsaturated or not, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, $\omega,\omega'$-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, transvinylidene diisocyanate, dicyclohexyl methane-4,4'-diisocyanate, 3,3'-dimethyl-dicyclohexyl methane-4,4'-diisocyanate, a toluene diisocyanate, 1,3-bis(1-isocyanato-1-methylethyl)benzene, 1,4-bis(1-isocyanato-1-methylethyl)benzene, 1,3-bis(isocyanatomethyl)benzene, a xylylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, polyisocyanates having isocyanurate structural units, the adduct of 2 molecules of a diisocyanate, e.g. hexamethylene diisocyanate or isophorone diisocyanate, to a diol, such as ethylene glycol, the adduct of 3 molecules of hexamethylene diisocyanate to 1 molecule of water (available under the trade designation Desmodur N from Bayer AG), the adduct of 1 molecule of trimethylol propane to 3 molecules of toluene diisocyanate (available under the trade designation Desmodur L from Bayer AG), the adduct of 1 molecule of trimethylol propane to 3 molecules of isophorone diisocyanate, compounds such as 1,3,5-triisocyanatobenzene and 2,4,6-triisocyanatotoluene, and the adduct of molecule of pentaerythritol to 4 molecules of toluene diisocyanate The reaction of the adduct of the monofunctional epoxy compound and the monoester of maleic acid, fumaric acid and/or itaconic acid with the difunctional or polyfunctional isocyanate compound is carried out, as a rule, at a temperature in the range of 20°–100° C. and preferably in the range of 50°–80° C. Optionally, use may be made of a catalyst such as a t-amine (e.g., triethylamine) or an organic tin compound (e.g., dibutyl tin oxide or dibutyl tin stearate) in a concentration of 0.01–1% by weight calculated on the constituents present.

The number average molecular weight of the addition polymers as described above should generally be in the range of 800 to 100000, preferably in the range of 800 to 15 000.

As mentioned above, suitable crosslinking agents in accordance with the present invention comprise unblocked monoprimary amines of the general formula (I)

$$H_2N-(CH_2)_n-NRR^1 \qquad (I)$$

wherein
n is a number from 1 to 4;
R is selected from an H atom, a $C_1$–$C_3$ alkyl and a monohydroxy substituted $C_1$–$C_3$ alkyl; and
$R^1$ is selected from a $C_1$–$C_3$ alkyl and a monohydroxy substituted $C_1$–$C_3$ alkyl.

More preferred are those wherein n is 2 or 3, R is a $C_1$–$C_3$ alkyl, and $R^1$ is a $C_1$–$C_3$ alkyl or monohydroxy substituted $C_1$–$C_3$ alkyl, such as N-methyl-N-(3-aminopropyl) ethanolamine, N-ethyl-N-(2-aminoethyl) ethylamine, N-methyl-N-(2-aminoethyl) methylamine and N-methyl-N-(3-aminopropyl) methylamine.

The coating compositions generally contain so much binder and crosslinking agent as to give a ratio of the number of equivalents of the ethylenically unsaturated double bonds of the binder to the number of equivalents of the primary amino groups of the crosslinking agent in the range of 1.5 to 2.5, preferably in the range of 1.9 to 2.1, most preferably 2.0 (stoichiometric).

The coating compositions usually also contain an organic solvent. As suitable examples may be mentioned aliphatic or aromatic hydrocarbons, esters, ethers, alcohols, ketones, diketo compounds such as acetyl ketone, nitroalkanes such as nitropropane, and (cyclo)aliphatic or aromatic esters of acetylacetic acid of which the (cyclo)alkyl group or the aromatic group has 1–20 carbon atoms, such as ethyl acetoacetate, cyclohexyl acetoacetate and phenyl acetoacetate. If, however, the binder is water-dilutable, the above-mentioned solvents may be replaced wholly or in part with water.

In addition, the coating compositions may contain the usual additives, such as pigments, fillers, leveling agents, emulsifiers, anti-foaming agents and other rheology control agents, antioxidants, UV stablizers, anti-sag agents and catalysts such as organic carboxylic acids. Optionally, the composition may contain a non-functional polymer, such as an acrylate (co)polymer, cellulose acetopropionate, cellulose acetobutyrate, nitrocellulose or a vinyl polymer.

The coating composition may be applied to a substrate in any suitable manner, such as by roller coating, spraying, brushing, sprinkling, flow coating or dipping. It is preferred that the composition should be applied by spraying.

Suitable substrates include those of metals which may be pretreated or not, wood, synthetic materials, paper, glass or leather. Suitable metals include iron, steel and aluminum. Curing of the coating may be carried out at a temperature of 0°–30° C. Optionally, a curing temperature above 30° C. may be used, so that the curing time may be reduced. For instance, the coating composition may be baked at a temperature in the range of 60°–120° C.

The invention will be further described in the following examples, which are not to be construed as limiting the scope of the present invention.

EXAMPLES

Preparation of Binder A

Into a reactor were charged 500.0 g of white spirit (boiling range 140°-165° C.) and 500 g of Solvesso 100 an aromatic hydrocarbon solvent containing trimethylbenzene, xylene, cumene and ethylbenzene which is available from EXXON Chemical Co., Houston, TX, which were heated to boiling temperature. Next, there were added separately, over a period of three hours, a first mixture of:

460.0 g of glycidyl methacrylate.
1071.0 g of styrene.
369.0 g of butyl acrylate and
100.0 g of lauryl methacrylate. and a second mixture of:
300.0 g xylene and
140.0 g of tert, butylperoxy-3.5.5-trimethyl hexanoate.

The reaction mixture was kept at boiling temperature until a conversion of over 98% was attained.

To 500.0 g of the composition thus prepared were added:

52.8 g of monomethyl maleate.
5.5 g of hydroquinone monomethyl ether and
0.3 g of chromium (III)-2-ethyl hexanoate.

and the resulting mixture was heated to 100° C. with air being passed through. The mixture was kept at 100° C. until an acid number of 2.3 was reached (the theoretical average maleic acid functionality was 4). then diluted with 66.0 g xylene.

Obtained was a 56.4% solution of the Binder A with a viscosity of 352 cPa.s (measured at 20° C. with a Rheomat 15 rotation viscometer) and a number average molecular weight of 3480.

For use in the following examples. Binder A was further diluted with butyl acetate to a 40% solids content.

Binder B

Into a reactor was charged 2073.0 g of xylene, which was heated to boiling temperature. Next, there were added separately, over a period of three hours, a first mixture of:

3463.0 g of glycidyl methacrylate,
2831.0 g of styrene,
3676.0 g of butyl acrylate and
521.0 g of decyl methacrylate.

and a second mixture of:
735.0 g of xylene and
735.0 g of tert, butylperoxy-3.5,5-trimethyl hexanoate.

The resulting reaction mixture was kept at boiling temperature until a conversion of over 98% was obtained, at which time a further 400.0 g of xylene was added.

To the composition thus prepared were added:
1528.0 g of acrylic acid.
3.8 g of chromium(III)-2-ethylhexanoate and
5.0 g of hydroquinone.

and the resulting mixture was heated to 110° C. with air being passed through until the acid number decreased to below 2. at which time the mixture was diluted with 500.0 g of xylene.

Obtained was a 79.4% solution of the Binder 8, which had an acid number of 0.8.

For use in the following examples, Binder 8 was further diluted with butyl acetate to a 40% solids content.

Examples 1-5 and Comparative Examples 1 and 2

Coating compositions on the basis of the above-described binders and crosslinking agents, as set forth in Table 1 below, were prepared by admixing stoichiometric amounts (2 equivalents ethylenically unsaturated double bond per equivalent primary amine) of the two components to attain a theoretical crosslinking of 100%.

The abbreviations of the crosslinking agents, as used in Table 1, are as follows:
(1) N-methyl-N-(3-aminopropyl) ethanolamine
(2) N-methyl-N-(2-aminoethyl) methylamine
(3) N-methyl-N-(3-aminopropyl) methylamine
(4) N-ethyl-N-(2-aminoethyl) ethylamine
(5) 2.2.4-trimethylhexamethylene diamine The pot life of such coating compositions was measured, after the mixing of the components, as the increase in the viscosity in conformance with the DIN cup method. The initial viscosity was set at 15 sec. measured with the aid of a DIN cup 4, and the pot life was the number of hours for the viscosity to increase by 100%. The results are presented below in Table 1.

To measure solvent resistance, immediately after mixing the resulting coating compositions were applied to glass panels, using a doctor blade, to a wet film thickness of 120 μm. A first set of panels was stoved for 30 minutes at 110° C. (drying condition I). and another set was allowed to dry for 7 days at room temperature (drying condition II). The cured films were all clear and exhibited high gloss. Solvent resistance to ethanol (EtOH) and methyl ethyl ketone (MEK) was measured by soaking a 0.5 cm diameter roll of cellulose paper in the solvent and rubbing back and forth (1 D-Rub) with about 400 g pressure on the film. The results after a set number of D-Rubs is assessed according to DIN53230 (0=unchanged; 5=very strongly attacked). The results are also presented below in Table 1.

TABLE 1

| Ex. | Binder | Cross. Agent | Solvent | Drying Cond. | No. of D-Rubs | Solvent Resist. | Potlife (hours) |
|---|---|---|---|---|---|---|---|
| 1a | A | (1) | EtOH | I | 100 | 2-3 | >18 |
| 1b | | | MEK | | 100 | 3 | |
| 1c | | | EtOH | II | 100 | 3 | |
| 1d | | | MEK | | 100 | 4 | |
| 2a | A | (2) | EtOH | I | 100 | 0 | >24 |
| 2b | | | MEK | | 100 | 2 | |
| 2c | | | EtOH | II | 100 | 2-3 | |
| 2d | | | MEK | | 100 | 2-3 | |
| 3a | A | (3) | EtOH | I | 100 | 0-1 | >24 |
| 3b | | | MEK | | 100 | 1-2 | |
| 3c | | | EtOH | II | 100 | 2 | |
| 3d | | | MEK | | 100 | 3 | |
| 4a | B | (2) | EtOH | I | 100 | 0 | 2-4,5 |
| 4b | | | MEK | | 100 | 0 | |
| 4c | | | EtOH | II | 100 | 1-2 | |
| 4d | | | MEK | | 100 | 3 | |
| 5a | B | (4) | EtOH | I | 100 | 1-2 | 2-4,5 |
| 5b | | | MEK | | 100 | 3-4 | |
| 5c | | | EtOH | II | 100 | 1-2 | |
| 5d | | | MEK | | 100 | 3 | |
| C1a | A | (5) | EtOH | I | 100 | 1 | 3 min. |
| C1b | | | MEK | | 100 | 1-2 | |
| C2a | B | (5) | EtOH | I | 100 | 0 | 5 min. |
| C2b | | | MEK | | 100 | 3-4 | |

These results demonstrate that a good combination of crosslinking, as shown by the solvent resistance, in combination with a good potlife can be obtained by the use of the particular unblocked monoprimary amines in accordance with the present invention. This is most evident from the coating compositions including Binder A, but is should also be noted that the potlife of the coating compositions comprising Binder B are acceptable and comparable to those described in previously incorporated EP-A-0203296 and EP-A-0346982. which requires the use of blocked amines.

Comparative Examples 1 and 2 demonstrate that, although other unblocked amines outside the scope of the present invention can be used successfully to crosslink the binders A and B, the resulting potlife renders such a system totally impractical for commercial purposes.

Many modifications and variations may be made to the embodiments specifically mentioned here without departing substantially from the concept of the present invention. Accordingly, it should be clearly understood that the preferred form of the invention described herein is exemplary only, and not intended as a limitation on the scope thereof.

I claim:

1. A liquid coating composition which comprises. as a binder, a compound containing at least two pendant activated unsaturated groups and a crosslinking agent for the activated unsaturated groups of the binder, wherein the crosslinking agent for the activated unsaturated groups of the binder comprises an unblocked monoprimary amine of the general formula (I)

$$H_2N\text{-}(CH_2)_n\text{-}NRR_1 \qquad (I)$$

wherein
n is a number from 1 to 4;
R is selected from an H atom, a $C_1$–$C_3$ alkyl group and monohydroxy substituted $C_1$–$C_3$ alkyl group; and
$R_1$ is selected from a $C_1$–$C_3$ alkyl group and a monohydroxy substituted $C_1$–$C_3$ alkyl group.

2. The liquid coating composition of claim 1, wherein the binder contains at least two pendant activated unsaturated groups of the formulas (II). (III). (IV) and/or (V),

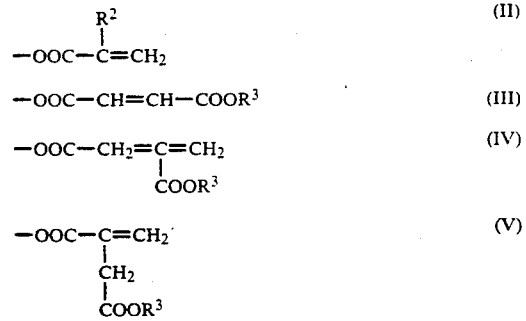

wherein
$R^2$ is selected from an H atom or a methyl group.
$R^3$ is selected from an H atom, a group $R^4$, a group of the formula (VI) and a group of the formula (VII)

$$-CH(OH)-CH_2-CH_2R^5 \qquad (VI)$$

$$-CH_2-CH(OH)-CH_2R^5 \qquad (VII)$$

$R^4$ is selected from an alkyl group, a cycloalkyl group and an aryl group, which groups may be substituted or not with an alkyl, and
$R^5$ is selected from an H atom, a group $R^4$, a group of the formula (VIII) and a group of the formula (IX)

$$-OR_4 \qquad (VIII)$$

$$-OOC-R_4 \qquad (IX).$$

3. The liquid coating composition of claim 2, wherein the binder containing pendant activated unsaturated groups of the formula (II) comprises an acryloyl and/or methacryloyl groups-containing compound.

4. The liquid coating composition of claim 2, wherein the binder containing pendant activated unsaturated groups of the formulas (III). (IV) and/or (V) comprises compounds obtained by the addition of maleic anhydride or itaconic anhydride to an OH groups-containing copolymer.

5. The liquid coating composition of claim 2, wherein the binder containing pendant activated unsaturated groups of the formulas (III), (IV) and/or (V) comprises compounds obtained by the reaction of a monoester of maleic acid, fumaric acid and/or itaconic acid with an at least difunctional epoxy compound.

6. The liquid coating composition of claim 2, wherein the binder containing pendant activated unsaturated groups of the formulas (III). (IV) and/or (V) comprises compounds obtained by reacting a monofunctional epoxy compound with a monoester of fumaric acid. maleic acid and/or itaconic acid, then reacting the resulting compound through the hydroxyl group with an at least difunctional isocyanate compound.

7. The liquid coating composition of claim 1, wherein the ratio of the number of equivalents of ethylenically unsaturated double bonds of the binder to the number of equivalents of the primary amino groups of the crosslinking agent is in the range of 1.5 to 2.5.

8. The liquid coating composition of claim 7, wherein said ratio is in the range of 1.9 to 2.1.

9. The liquid coating composition of claim 1, wherein n is 2 or 3, R is a $C_1$ to $C_3$ alkyl, and $R^1$ is a $C_1$ to $C_3$ alkyl or monohydroxy substituted $C_1$ to $C_3$ alkyl.

10. The liquid coating composition of claim 9, wherein the crosslinking agent is selected from the group consisting of
N-methyl-N-(3-aminopropyl) ethanolamine,
N-ethyl-N-(2-aminoethyl) ethylamine,
N-methyl-N-(2-aminoethyl) methylamine and
N-methyl-N-(3-aminopropyl methylamine.

11. A process of preparing a crosslinkable liquid coating composition comprising the step of combining a cross-linking agent comprising an unblocked monoprimary amine of the general formula (I), $$H_2N-(CH_2)_n-NRR^1 \qquad (I)$$

wherein n is a number from 1 to 4, R is selected from an H atom, $C_1$ to $C_3$ alkyl groups and monohydroxy-substituted alkyl groups and $R_1$ is selected from $C_1$ to $C_3$ alkyl groups and monohydroxy-substituted $C_1$ to $C_3$ alkyl groups with a binder compound containing at least two pendant activated unsaturated groups.

12. In a liquid coating composition comprising a binder compound containing at least two pendant activated unsaturated groups and an amine crosslinking agent, the improvement comprising the use as crosslinking agent for the activated unsaturated groups of said binder compound containing at least two pendant activated unsaturated groups of an unblocked monoprimary amine of the general formula (I),
wherein n is a number from 1 to 4;
R is selected from an H atom, a $C_1$ to $C_3$ alkyl and a monohydroxy substituted $C_1$ to $C_3$ alkyl.

* * * * *